United States Patent [19]

Van't Sant

[11] 4,140,147
[45] Feb. 20, 1979

[54] BUTTERFLY VALVE HAVING PURGE FLUID SUPPLY MEANS FOR THE SEAL

[75] Inventor: Willem C. Van't Sant, The Hague, Netherlands

[73] Assignee: Shell Oil Company, Houston, Tex.

[21] Appl. No.: 769,811

[22] Filed: Feb. 17, 1977

[30] Foreign Application Priority Data

Feb. 23, 1976 [GB] United Kingdom ............... 7039/76

[51] Int. Cl.² .............................................. F16K 1/22
[52] U.S. Cl. .............................. 137/240; 137/246.22; 251/306

[58] Field of Search .................. 137/240, 246.22, 340; 251/173, 175, 305–308

[56] References Cited

U.S. PATENT DOCUMENTS

| | | | |
|---|---|---|---|
| 1,897,781 | 2/1933 | Wille et al. | 137/340 X |
| 2,705,016 | 3/1955 | Saar | 137/340 X |
| 3,020,019 | 2/1962 | Fawkes | 251/175 |
| 4,003,394 | 1/1977 | Adams | 137/240 |

Primary Examiner—Martin P. Schwadron
Assistant Examiner—Richard Gerard

[57] ABSTRACT

A butterfly valve characterized by the addition of fluid purge supply means to prevent leakage.

3 Claims, 5 Drawing Figures

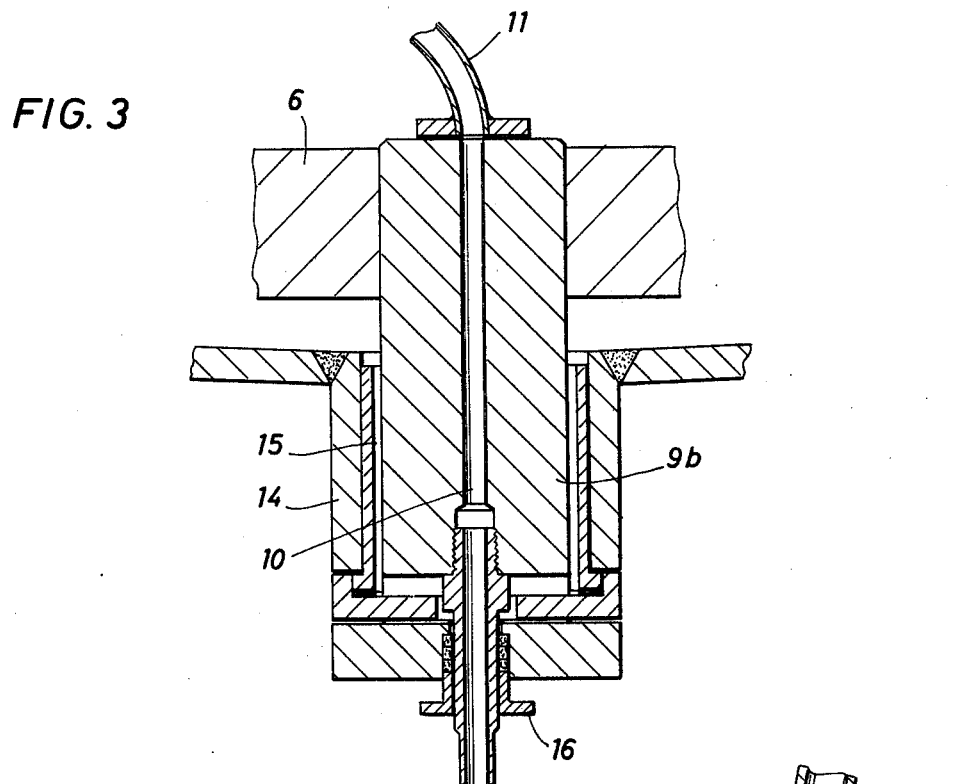
FIG. 3
FIG. 4
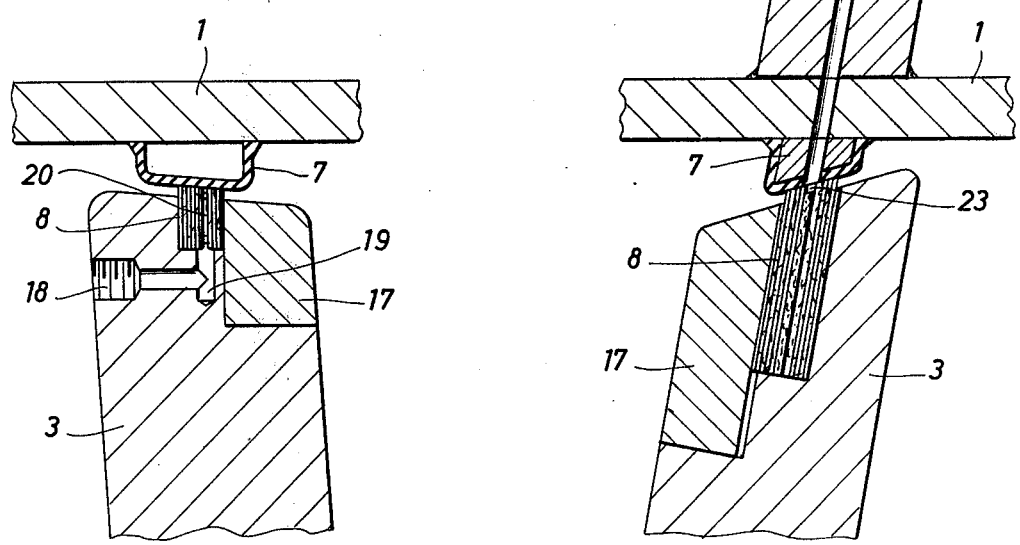
FIG. 5

BUTTERFLY VALVE HAVING PURGE FLUID SUPPLY MEANS FOR THE SEAL

BACKGROUND OF THE INVENTION

This invention concerns improvements in butterfly valves for the control of gaseous fluids. Butterfly valves are useful in many industrial application, particularly large installations with high sealing requirements.

Such valves, however, require a sealing ring around the periphery of the butterfly disc. This can be achieved by use of an actuating mechanism which is not sited in the plane of the valve disc and by use of a support bridge for the spindle or shaft of the valve which is braced to the valve housing in a manner which enables the employment of a shaft which does not extend beyond the circumference of the valve disc.

As valve sizes become larger, adequate leak-proof sealing becomes more difficult, particularly when valve disc diameters reach the order of a few meters.

Nonetheless, in some industrial applications, leakage cannot be tolerated. For example, where fluids are processed which are toxic, or where gases are separated which would otherwise react, leakage of valves cannot be permitted. Additional examples can be found in the field of regenerative heat exchange and in any other regenerative process which requires switching over to other treating fluids at periodic intervals. The invention, therefore, emcompasses a butterfly valve in which means are provided to prevent leakage by supplying a purge fluid to the sealing plane between the valve seal and the seat cooperating therewith.

SUMMARY OF THE INVENTION

Accordingly, in one aspect, the invention comprises a butterfly valve for the control of gaseous fluids comprising a valve housing, a valve seat positioned in the housing to accommodate a valve disc, a valve disc positioned in the housing, said valve disc bearing a seal at its periphery, and actuating means connected to the valve disc for opening and closing the valve by bringing the valve disc and seal into accommodation with the valve seat, the actuating means being provided with means for supplying a purge fluid to the sealing plane between the seal and the valve seat.

According to one embodiment of the invention, the actuating means comprises a rotatable shaft, not in the plane of the valve disc, having a purge fluid supply channel in the non-driven end of the shaft, through which a purge fluid is supplied to the sealing plane from the valve disc, and means are provided for distributing the purge fluid over the circumference of the valve seal from the supply channel in the shaft.

Preferably, the shaft consists of two parts, each being connected to the valve disc. The means for distributing the purge fluid comprise a supply pipe connected to the end of the channel at the end face of the non-driven shaft end, an endless substantially ring-shaped distributing pipe connected to the valve disc, the distributing pipe being in communication with the supply pipe, branch pipes in communication with the distributing pipe regularly distributed over the circumference of the disc and each being connected with bores in the edge part of the disc, which bores in turn each lead to the valve seal.

The valve seal may suitably be of the laminated type, in which the central lamelle is omitted and replaced by distance pieces thus creating a central annular channel open at the valve periphery, the bores in the edge part of the valve each leading to the central channel.

According to another embodiment of the invention, the purge fluid distributing means comprises a ring-shaped purge fluid distribution pipe around the valve housing and connected to a purge fluid supply source, branch pipes in communication with the distribution pipe, and regularly distributed over the circumference of the housing, each branch pipe being in communication with a bore in the housing, each bore leading to the sealing plane through the center of the valve seat.

In this embodiment, the seal is preferably of the laminated type, the central lamelle being shorter in radial sense than the other lamellae thus creating a central annular channel open towards the sealing plane, the channel facing each of the bores in the valve seat when the valve is in closed position.

The invention will now further be illustrated with reference to the accompanying drawing.

FIG. 3 is a detail on an enlarged scale showing the purging fluid supply connection to the valve, FIG. 4 is another detail on an enlarged scale showing part of the sealing function of the valve; and FIG. 5 is a view similar to that of FIG. 4 but showing an alternative embodiment.

Figure 1:
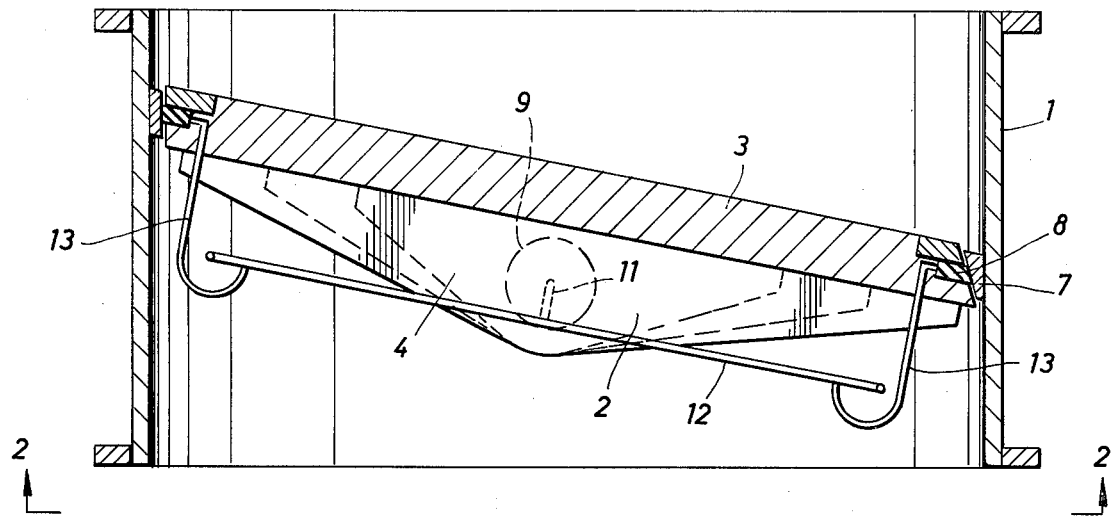
FIG. 1 is a diagrammatic sectional view of a butterfly valve and shows an embodiment of the invention.
Figure 2:
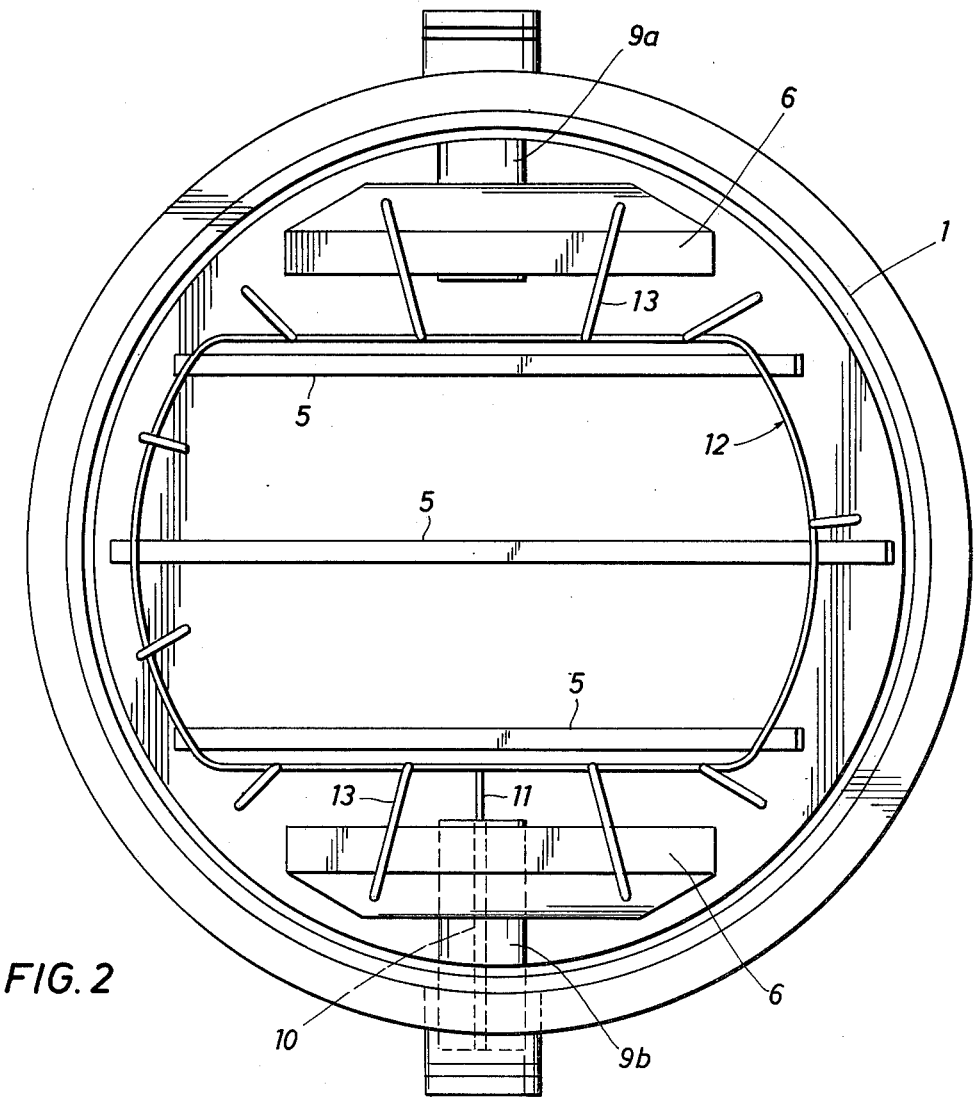
FIG. 2 is a plan view of the valve seen in the direction of line 2—2 of FIG. 1.

Referring to FIGS. 1 and 2, the valve casing is designated by 1, which casing is adapted to be inserted in a fluid conduit, and includes means for receiving, supporting and actuating a butterfly valve 2. Valve 2 comprises a valve disc 3 and a support bridge comprising a valve frame part 4. This framepart comprises a number of central frame elements 5 and shaft or spindle receiving elements 6. A valve seat 7 is welded to the casing 1 and is adapted to cooperate with valve sealing 8 provided at the rim of valve disc 3. A valve supporting and actuating shaft 9 comprises a driven shaft end 9a and a non-driven shaft end 9b, each end being welded to a frame element 6. So far the valve elements referred to are conventional for this type of valves, in particular the larger sized versions thereof.

FIG. 3 shows on an enlarged scale partially in cross-section that part of the valve assembly including the non-driven end 9b of the shaft or spindle. The shaft is housed in a bearing housing 15 by means of a bearing 14 in a usual manner, the bearing housing forming an integral part with valve casing 1 (not shown). The shaft end 9b is provided with an axial bore 10 for the supply of a purging fluid, such as steam, to the valve body. At the entry side provisions are made in a usual manner for the connection of a fluid supply pipe or hose including gland and packing means 16 since the shaft must be able to rotate over a certain degree without giving rise to leakage problems. At the outlet end face of the shaft, which is not in the plane of the valve disc, a flanged pipe 11 is connected to the shaft communicating with the bore 10, the pipe 11 leading to and being in communication with the endless central distribution pipe 12. This non-driven end of the shaft is very suitable for applying the purge fluid connection, since there are no further obstacles present such as parts of the driving mechanism.

FIG. 4 is a cross-section of part of the casing 1 comprising valve seat 7 and part of the valve comprising the sealing 8 cooperating with valve seat 7. The sealing consists in the embodiment shown of a laminated seal such as a copper asbestos seal. The sealing 8 is housed in a recess of the valve disc 3 and enclosed between the valve disc and a detachable disc part or clamping ring 17 thereof. Two bores 18 and 19, perpendicular to each other constitute a communication between the outer surface of valve disc 3 and sealing 8.

In the center of the sealing one layer of the laminated sealant is omitted and replaced by distance pieces so forming an annular slit 20 throughout the circumference of the valve disc, this channel providing a passage for the purge fluid to the sealing surface. Bore 19 is in communication with annular slit 20. A number of such bores 18, 19 are regularly distributed over the circumference of the valve disc, and situated on a radius on which the branch pipes 13 terminate and the bores are situated opposite these terminal ends of the branch pipes and connected therewith.

In the embodiment shown in FIG. 5, the provision for supplying a purge fluid to the sealing surface is different from the version described in FIGS. 1 through 4, in that the purge fluid distribution pipe (not shown) is arranged around the casing 1 of the valve and is in communication with a number of branch pipes (not shown), in turn in communication with the bores 22 of a number of nozzles 21 regularly distributed around the circumference of the casing. The bores 22 extend through the casing 1 and the seat 7 and supply the purge fluid to an annular groove 23 in laminated sealant 8, which groove is created by shortening the central lamelle of the sealant somewhat in radial sense, leaving space for a groove with a depth of about 6 mm and a width of about 3 mm.

This version is particularly suitable for use in valves of the more medium sizes. In such cases the risk of the purge fluid supply bore and the fluid receiving groove, in this version being situated in different elements, namely the valve seat and the valve body respectively, not precisely matching with each other is not present. Once these conditions are fulfilled, the embodiment according to FIG. 5 can be made cheaper than the other solution described before and has the further advantage that servicing and the like can take place without shutdown of the process in which the valve according to the invention is used.

We claim as our invention:

1. A butterfly valve for the control of gaseous fluids comprising a valve housing, a valve seat positioned in the housing to accommodate a valve disc, a valve disc positioned in the housing, said valve disc bearing a seal at its periphery, and actuating means connected to the valve disc for opening and closing the valve by bringing the valve disc and seal into accommodation with the valve seat, the actuating means comprising a rotatable shaft not in the plane of the valve disc and connected to the valve disc, the rotatable shaft comprising a driven part and a non-driven part, each part being connected to the valve disc; a purge fluid supply channel being provided through the non-driven part of the shaft and the housing, means connected to said fluid supply channel for distributing the purge fluid over the circumference of the valve seal, the means for distributing purge fluid comprising a supply pipe connected to the end of the purge fluid supply channel, an endless substantially ring-shaped distributing pipe connected to the valve disc and in communication with the purge fluid supply channel through the supply pipe; branch pipes spaced around and in communication with the distributing pipe and regularly distributed over the circumference of the disc, each branch pipe being connected with bores in the edge part of the disc, which bores in turn are in communication with the valve seal.

2. The valve of claim 1 wherein the non-driven part of the rotatable shaft is separate from the driven part, and the purge fluid supply channel terminates in the end face of the non-driven part of the shaft inside the housing.

3. The valve of claim 1 wherein the valve seal is of the laminated type, in which the central lamelle is omitted and replaced by distance pieces to form a central annular channel open at the valve periphery, the bores in the edge part of the valve each leading to the central channel.

* * * * *